United States Patent
Cui et al.

(10) Patent No.: US 11,818,023 B2
(45) Date of Patent: Nov. 14, 2023

(54) TRAFFIC-AWARE SWITCH-SHARED CACHE SCHEDULING METHOD AND DEVICE

(71) Applicant: Tsinghua University, Beijing (CN)

(72) Inventors: Yong Cui, Beijing (CN); Sijiang Huang, Beijing (CN); Mowei Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/728,374

(22) Filed: Apr. 25, 2022

(65) Prior Publication Data
US 2022/0345388 A1 Oct. 27, 2022

(30) Foreign Application Priority Data

Apr. 25, 2021 (CN) .......................... 20211045031.14

(51) Int. Cl.
| | |
|---|---|
| *H04L 43/0817* | (2022.01) |
| *H04L 43/0829* | (2022.01) |
| *H04L 43/0823* | (2022.01) |
| *H04L 43/0894* | (2022.01) |
| *H04L 47/122* | (2022.01) |
| *H04L 47/125* | (2022.01) |

(52) U.S. Cl.
CPC ...... *H04L 43/0817* (2013.01); *H04L 43/0841* (2013.01); *H04L 43/0847* (2013.01); *H04L 43/0894* (2013.01); *H04L 47/122* (2013.01); *H04L 47/125* (2013.01)

(58) Field of Classification Search
CPC ............. H04L 43/0817; H04L 43/0841; H04L 43/0847; H04L 43/0894; H04L 47/122; H04L 47/125; H04L 43/0835; H04L 43/16; H04L 49/90; H04L 49/30; H04L 43/08; H04L 47/10–11
See application file for complete search history.

(56) References Cited

U.S. PATENT DOCUMENTS

| | | | | |
|---|---|---|---|---|
| 6,424,622 B1 * | 7/2002 | Fan | ................... | H04Q 11/0478 370/395.41 |
| 2017/0048144 A1 * | 2/2017 | Liu | ....................... | H04L 12/413 |

\* cited by examiner

*Primary Examiner* — John A Follansbee
*Assistant Examiner* — Fadi Haj Said
(74) *Attorney, Agent, or Firm* — Hodgson Russ LLP

(57) ABSTRACT

A traffic-aware switch-shared cache scheduling method includes: S1, setting a cache threshold of each outgoing port of a switch according to a traffic state of each outgoing port of the switch; S2, monitoring each outgoing port of the switch to determine whether an event of packet entry queue, packet exit queue, packet loss, buffer overflow or port queue state change occurs; S3, determining a traffic state of the outgoing port according to the event that occurs at the outgoing port and corresponding port queue state information; S4, setting a port control state according to the traffic state of the outgoing port; and S5, adjusting the cache threshold corresponding to the outgoing port according to the port control state, and performing S2 to continue monitoring until the switch stops working.

8 Claims, 3 Drawing Sheets

TRAFFIC-AWARE SWITCH-SHARED CACHE SCHEDULING METHOD AND DEVICE

CROSS-REFERENCE TO RELATED APPLICATIONS

This application is based on and claims priority to Chinese Patent Application Serial No. 202110450314.1, filed on Apr. 25, 2021, the entire contents of which are incorporated herein by reference.

FIELD

The present disclosure relates to the technical field of switch-shared cache, in particular to a traffic-aware switch-shared cache scheduling method and device.

BACKGROUND

In a computer network, switch caches are used to absorb uneven traffic arriving at switch ports. In order to improve the efficiency of cache usage, currently commonly used commercial switches usually use on-chip shared memory. All outgoing ports of the same switch share a unified cache area, and different ports perform statistical multiplexing on the shared cache area. Since all ports share the cache, when some ports of the switch are heavily loaded, some ports may occupy all the cache while other ports cannot use the cache, resulting in unfairness among ports. In order to avoid the above unfairness, it is necessary to image the shared cache through a shared cache scheduling policy.

SUMMARY

In a first aspect, a traffic-aware switch-shared cache scheduling method is provided. The method includes:
  S1, setting a cache threshold of each outgoing port of a switch according to a traffic state of each outgoing port of the switch;
  S2, monitoring each outgoing port of the switch to determine whether an event of packet entry queue, packet exit queue, packet loss, buffer overflow or port queue state change occurs;
  S3, determining a traffic state of the outgoing port according to the event that occurs at the outgoing port and corresponding port queue state information;
  S4, setting a port control state according to the traffic state of the outgoing port; and
  S5, adjusting the cache threshold corresponding to the outgoing port according to the port control state, and performing S2 to continue monitoring until the switch stops working.

In a second aspect, a traffic-aware switch-shared cache scheduling device is provided. The device includes:
  a processor; and
  a memory, configured to store instructions executable by the processor,
  wherein the processor is configured to:
  set a cache threshold of each outgoing port of a switch according to a traffic state of each outgoing port of the switch;
  monitor each outgoing port of the switch to determine whether an event of packet entry queue, packet exit queue, packet loss, buffer overflow or port queue state change occurs;
  determine a traffic state of the outgoing port according to the event that occurs at the outgoing port and corresponding port queue state information;
  set a port control state according to the traffic state of the outgoing port; and
  adjust the cache threshold corresponding to the outgoing port according to the port control state, and continue monitoring until the switch stops working.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
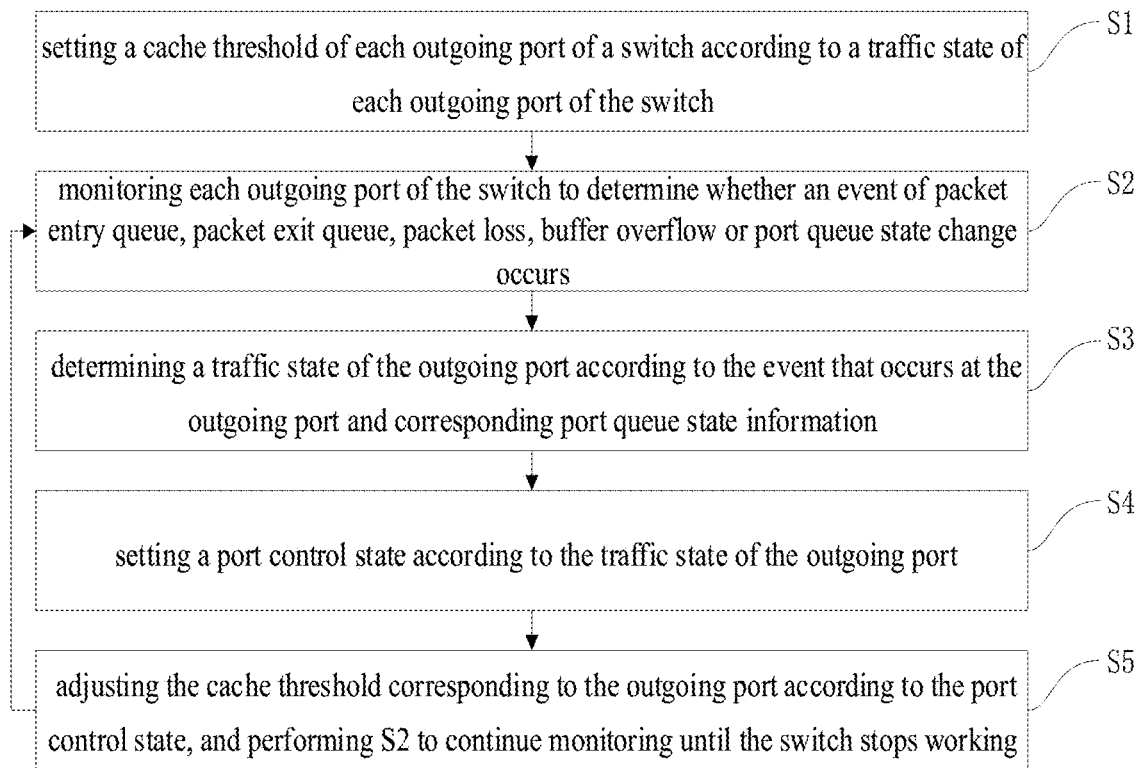
FIG. 1 is a flowchart of a traffic-aware switch-shared cache scheduling method according to embodiments of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A traffic-aware switch-shared cache scheduling method and device according to embodiments of the present disclosure will be described below with reference to the accompanying drawings.

FIG. 1 is a flowchart of a traffic-aware switch-shared cache scheduling method according to embodiments of the present disclosure.

As illustrated in FIG. 1, the method includes following steps.

In step S1, a cache threshold is set according to a traffic state of a port of a switch. By limiting the cache threshold that can be used by each outgoing port of the switch, allocation of shared cache resources in the switch among different outgoing ports is completed.

In step S2, during operation of the switch, each outgoing port of the switch is monitored in real time to determine whether an event of packet enqueue, packet dequeue, packet loss, buffer overflow or port queue state change occurs.

In step S3, if it is detected that the event occurs in step S2, it is determined that the traffic state of the port is light load, heavy load or overload according to the event and corresponding port queue status information.

Further, according to the event on the outgoing port, it is determined whether the outgoing port of the switch is in state transition between light load, overload or heavy load.

Continuous packet enqueue triggers a state transition from light load to heavy load.

Continuous packet dequeue triggers a state transition from heavy load to light load.

Continuous packet loss triggers a state transition from heavy load to overload.

Continuous packet dequeue or port queue length less than a preset threshold triggers a state transition from overload to light load.

In step S4, according to the traffic state of the port, it is determined that a control state of the port is a normal state, an absorption state or an emptying state.

Further, the traffic state of the port is used to determine the control state of the port, as follows.

When the port enters a heavy load state from a light load state, the control state of the port is set to the absorption state.

When the port enters the light load state from the heavy load state, the control state of the port is set to the normal state.

When the port enters an overload state from the heavy load state, the control state of the port is set to the absorption state.

When the port enters the light load state from the overload state, the control state of the port is set to the normal state.

In step S5, based on the control state of the port, the cache threshold of the port of the switch is adjusted, to change the upper limit of the cache that can be used by the port, and the above steps of monitoring the events of the outgoing port of the switch is repeated until the switch stops working.

Figure 2:
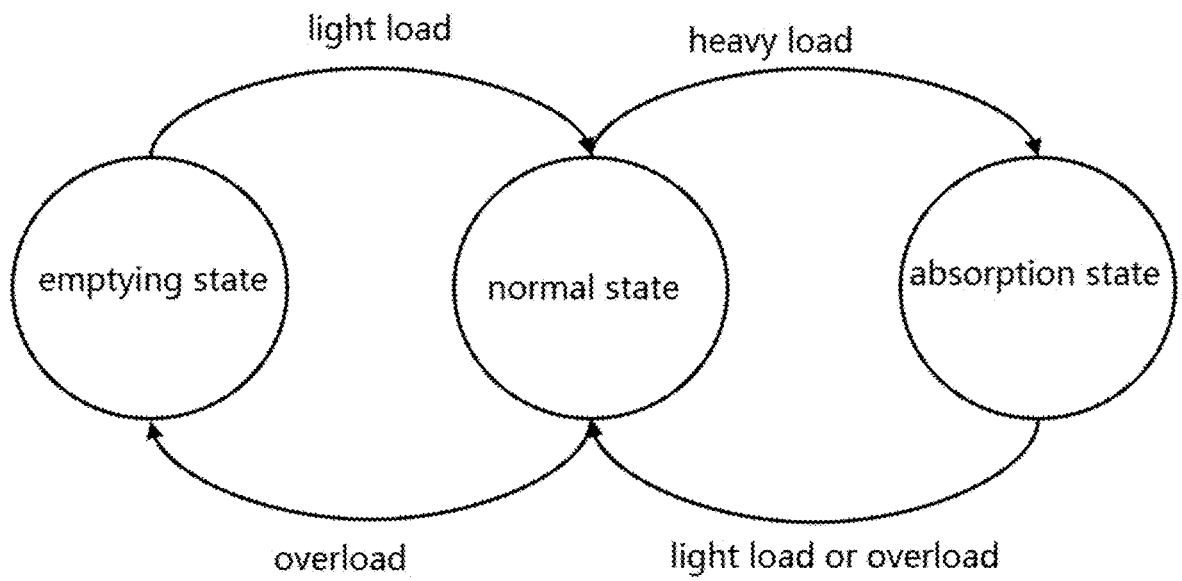
FIG. 2 is a schematic diagram of state transition in which a port control state is triggered to change by a port traffic state according to an embodiment of the present invention.

As shown in FIG. 2, the control state of the port is transferred by monitoring the real-time traffic state of the port. According to different control states of the port, the cache threshold of the port is calculated by the following formula, including:

$$T_i(t) = \begin{cases} \alpha \times \left(B - \sum_j Q_j(t)\right) & \text{if the port is in the normal state} \\ B/n' & \text{if the port is in the absorption state} \\ B/n & \text{if the port is in the emptying state} \end{cases}$$

where, $T_i(t)$ is the cache threshold of port i at time t, $\alpha$ is a control parameter, B is the total amount of shared cache of the switch, $Q_j(t)$ is the queue length of port i at time t, n is the total number of switch ports, n' is the number of ports in the heavy load state.

It could be understood that, in practical applications, traffic patterns are perceived through switch port events, port cache threshold decisions are made based on the judgment of traffic status, and different port cache allocation decisions are made.

Figure 3:
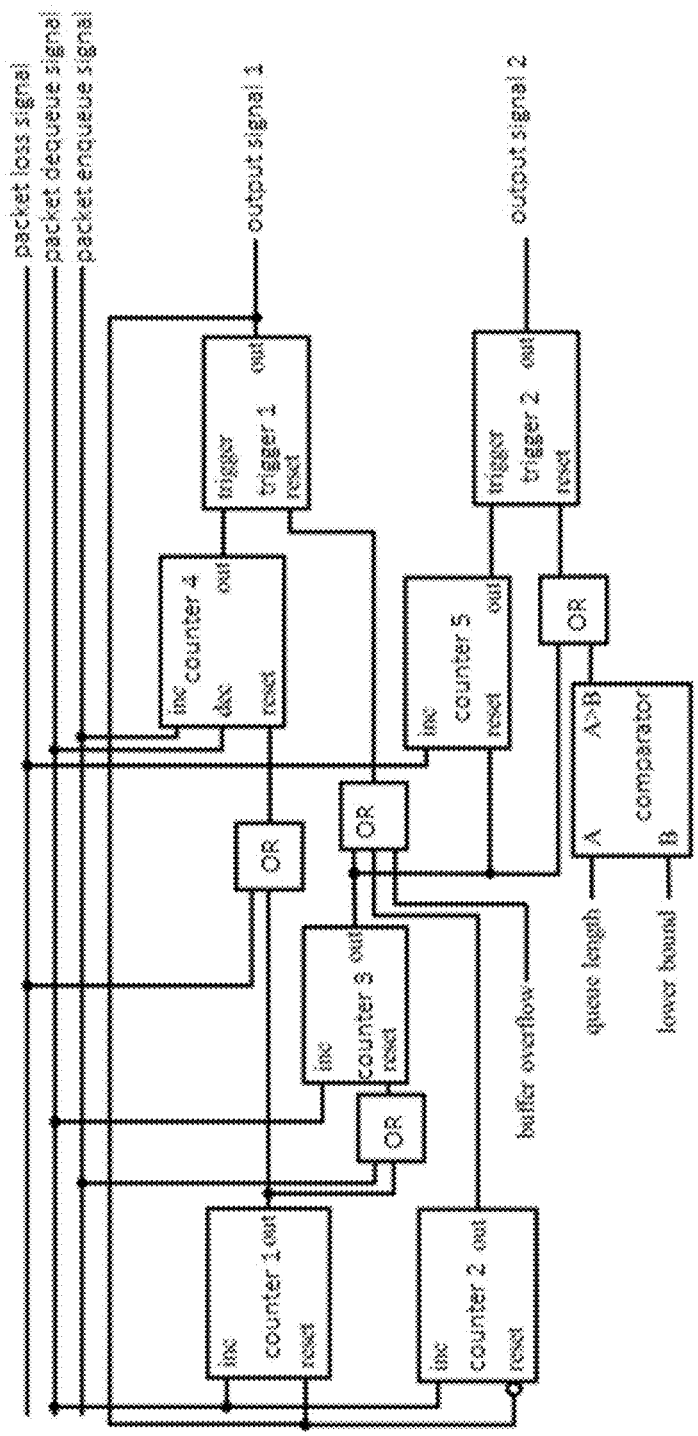
FIG. 3 is a schematic diagram of a logic circuit for determining a port traffic state according to an embodiment of the present disclosure.

As shown in FIG. 3, the method for determining the real-time traffic status refers to the logic circuit for determining the port traffic status shown in FIG. 3. The circuit is triggered by events such as packet entry, packet dequeue, packet loss, buffer overflow, and queue state change on the switch port, and is composed of counters, comparators and triggers. The specific functions of each part are as follows.

Counter 1 is used to count data packets out of the queue, and to determine whether the switch port is heavily loaded.

Counter 2 is used to count data packets out of the queue, and to determine whether the switch port is lightly loaded.

Counter 3 is used to count data packets out of the queue, and to determine whether the switch port is lightly loaded.

Counter 4 is used to count data packets into the queue, and to determine whether the switch port is heavily loaded.

Counter 5 is used to count the packet loss, and to determine whether the switch port is overloaded.

Trigger 1 and Trigger 2 are used to output real-time signals.

The comparator is used to compare the current port queue length with a preset lower bound value, and to determine whether the switch port is lightly loaded.

According to the traffic-aware switch-shared cache scheduling method proposed by the embodiments of the present invention, the port traffic state is determined by the switch port event signal, and the control state of the port is determined according to the real-time port traffic state, and the port cache threshold is controlled by using the control state of the port, so as to achieve the purpose of allocating switch-shared cache based on the traffic of the switch ports. Through real-time monitoring of port traffic, different ports can be managed differently according to their needs, thereby effectively improving the use efficiency of the shared cache of the switch.

Next, a traffic-aware switch-shared cache scheduling device according to an embodiment of the present disclosure is described with reference to the accompanying drawings.

Figure 4:
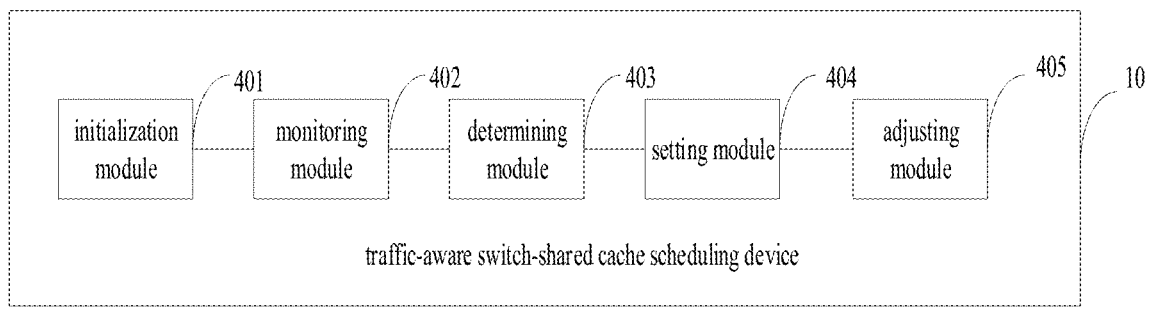
FIG. 4 is a block diagram of a traffic-aware switch-shared cache scheduling device according to embodiments of the present disclosure.

FIG. 4 is a block diagram of a traffic-aware switch-shared cache scheduling device according to embodiments of the present disclosure.

As shown in FIG. 4, the device includes an initialization module 401, a monitoring module 402, a determining module 403, a setting module 404 and an adjusting module 405.

The initialization module 401 is configured to set a cache threshold of each outgoing port of a switch according to a traffic state of each outgoing port of the switch.

The monitoring module 402 is configured to monitor each outgoing port of the switch to determine whether an event of packet entry queue, packet exit queue, packet loss, buffer overflow or port queue state change occurs.

The determining module 403 is configured to determine a traffic state of the outgoing port according to the event that occurs at the outgoing port and corresponding port queue state information.

The setting module 404 is configured to set a port control state according to the traffic state of the outgoing port.

The adjusting module 405 is configured to adjust the cache threshold corresponding to the outgoing port according to the port control state, and continue monitoring until the switch stops working.

Further, the determining module is configured to:
determine whether the outgoing port of the switch is in a state transition between light load, overload, or heavy load according to the event on the outgoing port;
wherein,
continuous packet enqueue triggers a state transition from light load to heavy load;
continuous packet dequeue triggers a state transition from heavy load to light load;
continuous packet loss triggers a state transition from heavy load to overload; and
continuous packet dequeue or a port queue length less than a preset threshold triggers a state transition from overload to light load.

Further, the setting module is configured to:
when the port enters a heavy load state from a light load state, set the port control state to the absorption state;

when the port enters the light load state from the heavy load state, set the port control state to the normal state;
when the port enters an overload state from the heavy load state, set the port control state to the absorption state; and
when the port enters the light load state from the overload state, set the port control state to the normal state.

Further, the adjusting module is configured to adjust the cache threshold corresponding to the outgoing port according to a formula of:

$$T_i(t) = \begin{cases} \alpha \times \left(B - \sum_j Q_j(t)\right) & \text{if the port is in the normal state} \\ B/n' & \text{if the port is in the absorption state} \\ B/n & \text{if the port is in the emptying state} \end{cases}$$

where, $T_i(t)$ is the cache threshold of port i at time t, $\alpha$ is a control parameter, B is a total amount of shared cache of the switch, $Q_j(t)$ is a queue length of port i at time t, n is a total number of ports of the switch, n' is the number of ports in the heavy load state.

According to the traffic-aware switch-shared cache scheduling device proposed by the embodiments of the present invention, the port traffic state is determined by the switch port event signal, and the control state of the port is determined according to the real-time port traffic state, and the port cache threshold is controlled by using the control state of the port, so as to achieve the purpose of allocating switch-shared cache based on the traffic of the switch ports. Through real-time monitoring of port traffic, different ports can be managed differently according to their needs, thereby effectively improving the use efficiency of the shared cache of the switch.

Embodiments of the present disclosure further provide a traffic-aware switch-shared cache scheduling device. The device includes a processor and a memory. The memory is configured to store instructions executable by the processor. The processor is configured to implement the traffic-aware switch-shared cache scheduling method described above by executing the instructions stored in the memory.

It should be noted that the foregoing explanations of the method embodiment are also applicable to the device of this embodiment, and details are not repeated here.

The terms "first" and "second" are only used for descriptive purposes, and should not be construed as indicating or implying relative importance or implicitly indicating the number of technical features indicated. Thus, a feature delimited with "first", "second" may expressly or implicitly include at least one of that feature. In the description of the present disclosure, "plurality" means at least two, such as two, three, etc., unless otherwise expressly and specifically defined.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternations, and variations can be made to the embodiments within the scope of the present disclosure.

What is claimed is:

1. A traffic-aware switch-shared cache scheduling method, comprising:
   S1, setting a cache threshold of each outgoing port of a switch according to a traffic state of each outgoing port of the switch;
   S2, monitoring each outgoing port of the switch to determine whether an event of packet entry queue, packet exit queue, packet loss, buffer overflow, or port queue state change occurs;
   S3, determining a traffic state of the outgoing port according to the event that occurs at the outgoing port and corresponding port queue state information;
   S4, setting a port control state according to the traffic state of the outgoing port; and
   S5, adjusting the cache threshold corresponding to the outgoing port according to the port control state, and performing S2 to continue monitoring until the switch stops working,
   wherein the port control state comprises a normal state, an absorption state, or an emptying state, and adjusting the cache threshold corresponding to the outgoing port according to the port control state, comprises:

$$T_i(t) = \begin{cases} \alpha \times \left(B - \sum_j Q_j(t)\right) & \text{if the port is in the normal state} \\ B/n' & \text{if the port is in the absorption state} \\ B/n & \text{if the port is in the emptying state} \end{cases}$$

where, $T_i(t)$ is the cache threshold of port i at time t, $\alpha$ is a control parameter, B is a total amount of shared cache of the switch, $Q_j(t)$ is a queue length of port i at time t, n is a total number of ports of the switch, n' is a number of ports in a heavy load state.

2. The method according to claim 1, wherein the traffic state comprises: light load, heavy load, or overload.

3. The method according to claim 1, wherein S3 further comprises:
   determining whether the traffic state of the outgoing port of the switch is in a state transition between light load, overload, or heavy load according to the event on the outgoing port;
   wherein:
   continuous packet enqueue triggers a state transition from light load to heavy load;
   continuous packet dequeue triggers a state transition from heavy load to light load;
   continuous packet loss triggers a state transition from heavy load to overload; and
   continuous packet dequeue or a port queue length less than a preset threshold triggers a state transition from overload to light load.

4. The method according to claim 2, wherein S4 further comprises:

when the traffic state of the outgoing port enters a heavy load state from a light load state, setting the port control state to the absorption state;

when the traffic state of the outgoing port enters the light load state from the heavy load state, setting the port control state to the normal state;

when the traffic state of the outgoing port enters an overload state from the heavy load state, setting the port control state to the absorption state; and when the traffic state of the outgoing port enters the light load state from the overload state, setting the port control state to the normal state.

5. A traffic-aware switch-shared cache scheduling device, comprising:

a processor; and a memory, configured to store instructions executable by the processor, wherein the processor is configured to:

set a cache threshold of each outgoing port of a switch according to a traffic state of each outgoing port of the switch;

monitor each outgoing port of the switch to determine whether an event of packet entry queue, packet exit queue, packet loss, buffer overflow or port queue state change occurs;

determine a traffic state of the outgoing port according to the event that occurs at the outgoing port and corresponding port queue state information;

set a port control state according to the traffic state of the outgoing port; and adjust the cache threshold corresponding to the outgoing port according to the port control state, and continue monitoring until the switch stops working, wherein the port control state comprises a normal state, an absorption state, or an emptying state, and the processor is configured to adjust the cache threshold corresponding to the outgoing port according to a formula of:

$$T_i(t) = \begin{cases} \alpha \times \left(B - \sum_j Q_j(t)\right) & \text{if the port is in the normal state} \\ B/n' & \text{if the port is in the absorption state} \\ B/n & \text{if the port is in the emptying state} \end{cases}$$

where, $T_i(t)$ is the cache threshold of port i at time t, $\alpha$ is a control parameter, B is a total amount of shared cache of the switch, $Q_j(t)$ is a queue length of port i at time t, n is a total number of ports of the switch, n' is a number of ports in a heavy load state.

6. The device according to claim 5, wherein the traffic state comprises: light load, heavy load, or overload.

7. The device according to claim 5, wherein the processor is configured to:

determine whether the traffic state of the outgoing port of the switch is in a state transition between light load, overload, or heavy load according to the event on the outgoing port;

wherein:

continuous packet enqueue triggers a state transition from light load to heavy load;

continuous packet dequeue triggers a state transition from heavy load to light load;

continuous packet loss triggers a state transition from heavy load to overload; and continuous packet dequeue or a port queue length less than a preset threshold triggers a state transition from overload to light load.

8. The device according to claim 6, wherein the processor is configured to:

when the traffic state of the outgoing port enters a heavy load state from a light load state, set the port control state to the absorption state;

when the traffic state of the outgoing port enters the light load state from the heavy load state, set the port control state to the normal state;

when the traffic state of the outgoing port enters a overload state from the heavy load state, set the port control state to the absorption state; and when the traffic state of the outgoing port enters the light load state from the overload state, set the port control state to the normal state.

* * * * *

UNITED STATES PATENT AND TRADEMARK OFFICE
CERTIFICATE OF CORRECTION

| | |
|---|---|
| PATENT NO. | : 11,818,023 B2 |
| APPLICATION NO. | : 17/728374 |
| DATED | : November 14, 2023 |
| INVENTOR(S) | : Yong Cui, Sijiang Huang and Mowei Wang |

It is certified that error appears in the above-identified patent and that said Letters Patent is hereby corrected as shown below:

On the Title Page

Item (30) "Foreign Application Priority Data" should read:
--Apr. 25, 2021 (CN) .................... 202110450314.1--

Signed and Sealed this
First Day of October, 2024

Katherine Kelly Vidal
*Director of the United States Patent and Trademark Office*